United States Patent Office 3,769,324
Patented Oct. 30, 1973

3,769,324
PRODUCTION OF CARBOXYLIC ACIDS
AND ESTERS
Frank E. Paulik, St. Louis, Arnold Hershman, Creve
Coeur, James F. Roth, Maryland Heights, and Walter
R. Knox, Town and Country, Mo., assignors to Monsanto Company, St. Louis, Mo.
No Drawing. Continuation of application Ser. No. 2,374,
Jan. 12, 1970, which is a continuation-in-part of applications Ser. No. 628,578 and Ser. No. 628,591, both
Apr. 5, 1967, all now abandoned. This application June
15, 1972, Ser. No. 263,330
Int. Cl. C07c 51/14, 67/00
U.S. Cl. 260—476 R  19 Claims

ABSTRACT OF THE DISCLOSURE

The present invention relates to a process for the preparation of aromatic carboxylic acids and esters, specifically by the reaction of aromatic alcohols and the ester, ether and halide derivatives thereof and carbon monoxide in the presence of catalyst systems containing as active constituents a metal component in which the metal is selected from the group consisting of iridium, osmium and ruthenium and a halogen component. The process is also directed to the production of mixtures of such acids and/or their esters.

---

This application is a continuation of application Ser. No. 2,374, filed Jan. 12, 1970, now abandoned. Application Ser. No. 2,374 was a continuation-in-part application of application Ser. No. 628,578 and application Ser. No. 628,591, both filed Apr. 5, 1967 and both now abandoned.

BACKGROUND OF THE INVENTION

This invention relates to a process for the preparation of aromatic carboxylic acids and the esters thereof. More particularly, it relates to a process for the reaction of primary aromatic alcohols and the ester, ether and halide derivatives thereof with carbon monoxide in the presence of catalyst systems containing as active constituents a metal component in which the metal is iridium, osmium or ruthenium, and a halogen component to yield aromatic carboxylic acids and/or the esters thereof selectively and efficiently.

Carbonylation processes for the preparation of carboxylic acids from alcohols are well known in the art. The prior art teaches the use of a number of catalysts for the synthesis of carboxylic acids by reaction of alcohols with carbon monoxide at elevated temperatures and pressures in both gas phase fixed bed reactions and liquid phase reactions. Catalysts such as phosphoric acid, phosphates, activated carbon, heavy metal salts such as zinc and cuprous chlorides, silicates of various metals, and boron trifluoride in various hydration states have been reported to function for the production of such acids as acetic acid by reaction of alcohols such as methyl alcohol, and carbon monoxide at elevated temperatures and pressures of the order of 400° C. and 10,000 p.s.i.g., respectively. Somewhat less severe reaction conditions of temperature and/or pressure have been reported in the literature employing specific catalyst compositions, e.g., 330° C.–340° C. and 2250 p.s.i.g. using liquid phosphoric acid containing copper phosphate; 300° C.–500° C. and 2000 p.s.i.g.–4000 p.s.i.g. uing active charcoal impregnated with phosphoric acid; and 260° C.–360° C. and 2800 p.s.i.g.– 15,000 p.s.i.g. using metal carbonyls, such as iron, cobalt and nickel, in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of carbonylation processes of the prior art is their dependence upon the use of catalysts comprised of such metal carbonyls or modified metal carbonyls as dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3000 p.s.i.g. to 10,000 p.s.i.g. under normal carbonylation conditions of 175° C. to 300° C.

Still another disadvantage of carbonylation processes disclosed in the prior art is their relatively low level of activity. This low level of activity requires higher catalyst concentrations, longer reaction times, and higher temperatures to obtain substantial reaction rates and conversions. Consequently, larger and costlier processing equipment is required.

Another disadvantage of carbonylation processes disclosed heretofore is their inability to maintain high selectivity to the desired carboxylic acid at temperatures required for high conversion levels and high reaction rates. At these higher temperatures, undesirable by-products such as aldehydes, higher carboxylic acids, carbon dioxide, methane and water are formed, thereby resulting in substantial yield losses and necessitating additional product purification and recycle steps in the processing.

Another disadvantage of carbonylation processes described in the prior art is their dependence on catalyst systems which require the use of substantially chemically pure carbon monoxide feed-stocks to maintain high selectivity and high yield to the desired carboxylic acid product. For example, certain cobalt containing catalyst systems described heretofore when employed with carbon monoxide feed streams containing impurities such as hydrogen, result in the production of a number of undesirable by-products including methane, carbon dioxide, aldehydes of the same carbon numbers as the desired carboxylic acid, and carboxylic acids of higher carbon number than desired. Consequently, substantial loss in selectivity and yield to the desired carboxylic acid occurs. Often additional process steps are required to remove these undesirable by-products, necessitating the use of larger and costlier processing equipment.

It is, therefore, an object of the present invention to overcome the above disadvantages and thus provide an improved and more economically and commercially feasible carbonylation process for the production of organic acids and their esters.

Another object of this invention is to provide a more reactive and more stable carbonylation catalyst system than has been heretofore described in the prior art.

Still another object of the present invention is to provide a more selective and more reactive carbonylation catalyst system for the production of aromatic carboxylic acids.

Another object of the present invention is to provide a carbonylation catalyst system which results in the production of a higher yield of the desired aromatic carboxylic acid with no substantial formation of undesirable by-products.

Still another object of the present invention is the provision of an improved carbonylation process enabling the efficient and selective production of aromatic carboxylic acids or their esters by reaction of aromatic alcohols and alcohol derivatives with carbon monoxide in the presence of an improved and more stable catalyst system, thus enabling the use of lower catalyst concentration, lower temperature, lower pressure, and shorter contact time than has been generally possible heretofore and facilitating product isolation, catalyst recovery and recycle without substantial catalyst decomposition and loss.

These and other objects of the present invention will become apparent to those skilled in the art from the accompanying description and disclosure.

SUMMARY OF THE INVENTION

In accordance with the present invention, a feed component comprising an aromatic alcohol or the ester, ether or halide derivatives thereof or mixtures of these are converted selectively to an aromatic carboxylic acid or an ester of such acid or a mixture of such acid and ester, by reacting the feed component in the liquid phase with carbon monoxide at temperatures from about 50° C. to 300° C. and at partial pressures of carbon monoxide from 1 p.s.i.g. to 15,000 p.s.i.g. preferably 5 p.s.i.g. to 3,000 p.s.i.g., and more preferably 10 p.s.i.g. to 1,000 p.s.i.g. although higher pressure may be employed in the presence of a catalyst system containing as active constituents a metal component in which the metal is selected from the group consisting of iridium, osmium and ruthenium, and a halogen component in which the halogen is selected from the group consisting of bromine and iodine, preferably iodine. The present process is particularly advantageous at lower pressures, although higher pressures may also be used.

DESCRIPTION OF THE PREFERRED EMBODIMENTS OF THE PRESENT INVENTION

As referred to above, for purposes of the present invention, the catalyst system essentially includes a metal component seelcted from the group consisting of iridium, osmium and ruthenium, and a halogen component in which the halogen is either bromine or iodine. Generally, the metal component of the catalyst system of the present invention is believed to be present in the form of a coordination compound of such metal with a halogen component providing at least one of the ligands of such coordinate compound. In addition to the metal component and halogen in the process of the present invention, these coordinate compounds also generally include carbon monoxide ligands thereby forming such compounds or complexes of the metal as $Os(CO)_4Br_2$, $Ir(CO)_2I_2$, $Os(CO)_4I_2$, $Ru(CO)_2I_2$, $Ir_2(CO)_3Br$, $Ir(CO)_2Br_2$, and the like. Other moieties may be present if desired. Generally, it is preferred that the catalyst system contain as a promoting component an excess of halogen over that present as ligands in the metal containing coordination compound. The terms "coordination compound" and "coordination complex" used throughout this specification mean a compound or complex formed by combination of one or more electronically rich molecules or atoms capable of independent existence with one or more electronically poor molecules or atoms, each of which may also be capable of independent existence.

The essential metal and halogen component of the catalyst system of the present invention may be provided by introducing into the reaction zone a coordination compound of the metals defined herein containing halogen ligands or may be provided by introducing into the reaction zone separately an iridium, osmium or ruthenium metal, or the salts, oxides, organo compounds and coordination compounds of such metals and the like. Specific examples of materials capable of providing the metal constituent of the catalyst system of the present invention may be taken from the following non-limiting partial list of suitable materials.

$IrCl_3$
$IrBr_3$
$IrI_3$
$IrCl_3 \cdot 4H_2O$
$IrBr_3 \cdot 4H_2O$
$Ir(CO)_2Cl_2$
$Ir(CO)_2Br_2$
$Ir(CO)_2I_2$
$Ir_2(CO)_8$
$Ir[(C_6H_5)_3P]_2(CO)I$
$Ir[(C_6H_5)_3P]_2(CO)Cl$
$IrCl[C_6H_5)_3P]_2(CH_3I)_2$
$Ir(SnCl_3)[(C_6H_5)_3P]_3$
Ir metal
$Ir(NO_3)_3$
$IrCl(CO)[(C_6H_5)_3As]_2$
$IrI(CO)[(C_6H_5)_3Sb]_2$
$RuCl_3$
$RuBr_3$
$RuI_3$
$OsCl_3$
$Ru(CO)_4I_2$
$Ru_3(CO)_{12}$
$RuCl_2(CO)[(C_6H_5)_3P]_3$
$RuI_2(CO)[C_6H_5)_3As]_3$
$RuBr_2(CO)[n-C_4H_9)_3P]_3$
$RuBr_3(CO)[(C_6H_5)_3P]_2$
$[(n-C_4H_9)_4N][Ir(CO)_2X_2$ where $X=Cl^-$, $Br^-$, $I^-$
$[(N-C_4H_9)_4As]_2[Ir_2(CO)_4Y_4]$ where $Y=Br^-$
$[(n-C_4H_9)_4P][Ir(CO)I_4]$
$Ir[(C_6H_5)_3P]_2(CO)Br$
$Ir[(n-C_4H_9)_3P]_2(CO)Br$
$Ir[(n-C_4H_9)_3P]_2(CO)I$
$IrBr[(C_6H_5)_3P]_3$
$IrI[(C_6H_5)_3P]_3$
$IrCl[(C_6H_5)_3P]_3$
$IrCl[(C_6H_5)_3P]_3H_2$
$[(C_6H_5)P]Ir(CO)H$
$[Ir(C_2H_4)_2Cl]_2$
$K_4Ir_2Cl_2(SnCl_3)_4$
$Ir_2O_3$
$K_4Ir_2Br_2(SnBr_3)_4$
$K_4Ir_2I_2(SnI_3)_4$
$K_2[Ru_2(SnCl_3)_2]$
$Os(CO)_4X_2$ where $X=Cl$, $Br$, $I$
$Os_3(CO)_{12}$
$Os(CO)_5$
$OsCl_3(CO)[(n-C_4H_9)_3P]_2$
$OsBr_3[(C_6H_5)_3As]_3$
$OsBr_2[(C_6H_5)_3P]_3$
Os metal
Ru metal The preferred metal component for the catalyst system of the present invention is iridium.

With those materials listed above as capable of providing the metal component which do not contain a halogen component from the group consisting of bromine and iodine, it will be necessary to introduce into the reaction zone such a halogen component. For example, if the metal component introduced is the metal itself or an oxide thereof, it will be necessary to also introduce a halide component such as methyl iodide, hydrogen iodide, iodine or the like.

As noted above, while the halogen component of the catalyst system may be in combined form with the metal component as, for instance, one or more ligands in a coordination compound of iridium, osmium or ruthenium, it generally is preferred to have an excess of halogen present in the catalyst system as a promoting component. By excess is meant an amount of halogen greater than 2 atoms of halogen per atom of the metal in the catalyst system. This promoting component of the catalyst system consists of a halogen and/or halogen compound such as hydrogen halide, alkyl- or aryl halide, metal halide, ammonium halide, phosphonium halides, arsonium halide, stibonium halide and the like. The halogen of the promoting component may be the same or different from that already present as ligands in the coordination compound of the metal. Generally, the halogen in the promoting component is iodine or bromine with iodine being preferred. Accordingly, suitable halogen providing or promoting components may be selected from the following list of halogen and/or halogen-containing compounds.

RX where R=any alkyl- or aryl-group, and X=Br or I, e.g., $CH_3I$, $C_6H_5Br$, $CH_3CH_2I$, etc.;

$X_2$ or $X_3^-$ where X=Br or I, e.g., $Br_2$, $I_2$, $I_3^-$, etc.;

HX where X=Br or I, e.g., HBr, HI;

$$\underset{\underset{O}{\|}}{RCX}$$

where R-any alkyl- or aryl-group, and X-Br or I, e.g., $$\underset{\underset{O}{\|}}{CH_3Cl},$$

etc.;

$R_4MX$, $R_4MX_3$ or $R_3MX_2$ where R=hydrogen or any alkyl, M=N, P, As or Sb, X=Br or I, e.g., $NH_4I$, $PH_4I_3$, $PH_3I_2$, $PH_3BR_2$, $(C_6H_5)_3PI_2$, and/or combinations of R, M and X.

Although any amount of the promoting component of the catalyst system of the present invention may be employed, the amount employed is such as to produce a ratio of atoms of halogen to atoms of metal in the catalyst system of from above 2:1 to 50,000:1 and higher. However, the preferred ratio is 3:1 to 5,000:1 halogen atoms per metal atom. A more preferred ratio of halogen atoms to metal atoms is 5:1 to 2500:1.

The liquid reaction medium employed may include any solvent compatible with the catalyst system and may include pure aromatic alcohols, or mixtures of such alcohol feedstocks and/or the desired aromatic carboxylic acid and/or esters of such acids. However, the preferred solvent and liquid reaction medium for the process of this invention is the desired aromatic carboxylic acid itself. Water may also be added to the reaction mixture if desired.

Suitable feedstocks are the aromatic alcohols although such alcohols may be charged together with an aromatic acid or ester. The term "aromatic alcohol," as used herein, is meant to include not only the aromatic alcohols in which the —OH group is attached to a hydrocarbyl substituent to the aromatic nucleus, i.e., benzyl alcohol, but also the aromatic compounds in which the —OH group is attached directly to the aromatic nucleus, i.e., phenol, cresols, etc. In addition to the aromatic alcohols, the ester, ether and halide derivatives thereof are suitable feedstocks to the present process. Examples of useful feedstocks employed for the carbonylation reaction of the present invention include the following compounds:

Phenol, o-, m- and p-cresol, catechol, resorcinol, quinol, pyrogallol, phloroglucinol, benzyl alcohol, alpha-phenylethyl alcohol, benzyl carbinol, methylbenzyl alcohol, benzyl iodide, benzyl acetate and the like. The aromatic radical may be mono-cyclic or polycyclic. In addition, the aromatic radical may be mono-substituted or polysubstituted and when polysubstituted the substituents may be alike or different. The particularly useful feedstocks to the present process are the mono-cyclic aromatic alcohols having no more than two alcohol radicals substituted thereto and no more than one non-alcohol group containing radical substituted thereto. The preferred feedstocks are the aryl alkyl alcohols in which the aryl radical is mono-cyclic and the alkyl radicals have no greater than four carbon atoms. A particularly preferred aromatic alcohol is benzyl alcohol.

In accordance with the present invention, the carbonylation reaction may be carried out by intimately contacting the above defined feed components, preferably an aromatic alcohol, which depending on the carbon number and operating conditions may either be in the vapor or liquid phase with gaseous carbon monoxide in a liquid phase containing a catalyst system such as iridium dicarbonyl diiodide and a halogen-containing promoting component, such as methyl iodide, under conditions of temperature and pressure suitable as described herein to form the carbonylation product. The particular conditions selected are the same whether the feed component is charged as a vapor or liquid. The temperature, accordingly, will be in the range of 50° C. to 300° C. with the preferred range being 100° C. to 240° C. Partial pressures of carbon monoxide of the order of 1 p.s.i.g. to 15,000 p.s.i.g. may be employed, however, 5 p.s.i.g. to 3,000 p.s.i.g. carbon monoxide partial pressure is generally preferred and a more preferred range is from 10 p.s.i.g. to 1,000 p.s.i.g. Higher pressures may be used if desired under appropriate conditions.

Alternatively, aromatic carboxylic acids may be produced if desired via reaction of the feed components and carbon monoxide in the vapor phase over the metal containing catalyst systems described above dispersed upon inert supports. Such a catalyst system may be operated as a conventional fixed bed catalytic reactor. For example, benzyl alcohol, methyl iodide and carbon monoxide may be passed over a catalyst system consisting such as $Ru(CO)_2[P(C_6H_5)_3]_2I_2$ or $Ru(CO)_2I_2$ dispersed on an inert support material such as alundum, activated carbon clays, alumina, silica-alumina and ceramics, etc., in a fixed bed reactor maintained at elevated temperature and pressure, as described above, to produce phenylacetic acid in high yields. However, use of a liquid reaction medium as above described is preferred in the process of this invention.

While any amount of carbon monoxide may be employed, a typical carbonylation reaction selective to carboxylic acid requires at least one mole of carbon monoxide per hydrocarbonyl radical available for carbonylation (molar basis). Excess of carbon monoxide over the aforesaid stoichiometric amount, however, may be present. Carbon monoxide streams containing inert impurities such as hydrogen, carbon dioxide, methane, nitrogen, noble gases, water and paraffinic hydrocarbons having from 1 to 4 carbon atoms, may be employed, if desired, for example, from an available plant gas stream with no adverse effect; however, in such cases, total reactor pressure will have to be increased to maintain a desired carbon monoxide parital pressure. The concentration of carbon monoxide in the feed gas mixture may be from 1 vol. percent to 100 vol. percent a most useful range being from 10 vol. percent to 99.9 vol. percent. Preferably, however, such range is from 30 vol. percent to 70 vol. percent.

The reaction rate is dependent upon catalyst concentration and temperature. Concentrations of the metal containing component of the catalyst system in the liquid phase, between $10^{-6}$ moles/liter and $10^{-1}$ moles/liter, are normally employed with the preferred range being $10^{-4}$ moles/liter to $10^{-2}$ moles/liter. Higher concentrations even to the extent of 1 mole/liter may, however, be used if desired. Higher temperatures also favor higher reaction rates.

The active iridium, osmium or ruthenium containing catalytic system is preferably supplied as a catalyst solution. The solution can also include liquid reactants, product and mixtures thereof which function as solvents or reaction media. A preferred group of solvents for use when reacting the aforementioned preferred aromatic alcohols is comprised of the aromatic alcohol in the feed, an aromatic acid having 1 carbon atom more than such aromatic alcohol, the ester of the said acid and the said alcohol, the diether of the said alcohol, a halide of the said alcohol and mixtures thereof. A still more preferred group of solvents is comprised of the aforesaid aromatic alcohol, the acid, and the tester of the said acid.

When an ester, ether or halide is present in the feedstock or reaction medium, it is normally charged with equimolar amounts of water, although more or less water may be used. Water may exert an effect on the reaction. An amount of water in excess of the equimolar quantity of water to ester, ether or halide, e.g., an excess equal to 50% to 300% of such equimolar quantity, appears to promote the production of the aromatic carboxylic acid. On the other hand, smaller quantities of water, e.g., 50% to 100% of the equimolar proportions discussed above, appears to favor the production of an ester of such acid.

The above catalyst solutions essentially comprised of: (1) the aromatic alcohol-product acid medium, (2) the metal component, and (3) a halogen component generally in excess of the metal as hereinabove set forth, may be further modified by the addition of a high boiling, inert solvent as a further component. Such an inert solvent must have a boiling point at least 25° C. higher (S.T.P.) than the product aromatic acid and/or ester. Inert solvents within the present category include high boiling paraffin hydrocarbons, aromatic hydrocarbons boiling above the product aromatic acid and/or ester, higher boiling organic acids and esters and also orthophosphorus and orthosilicon alkoxy esters, as well as the chlorine, bromine and iodine containing derivatives of all of the above said solvents.

The catalyst systems of the present invention are characterized by an unusually high degree of specificity for the carbonylation reaction, e.g., the reaction of aromatic alcohols with carbon monoxide to obtain a aromatic carboxylic acid. Such control over the various competing reactions to obtain the aromatic carboxylic acid in high yield is surprising since other metal catalysts do not appear to show such specificity for this reaction. The iron group metals such as iron, cobalt and nickel differ from the present catalyst systems in that usually the iron group metals simultaneously catalyze hydrogenation reactions to a very high degree. Consequently, the products obtained include higher alcohols as well as aldehydes and higher carboxylic acids than the desired aromatic carboxylic acid product. Furthermore, the iron group catalysts, particularly cobalt, require a far higher carbon monoxide partial pressure to remain stable. When moderate pressures, e.g., less than about 2,000 p.s.i.g. carbon monoxide partial pressure are employed at a temperature of 175° C., the cobalt catalyst is found to plate out or decompose to the free metal which plates on the walls of the reactor and is thus lost as a catalyst.

Another distinction of the catalyst systems disclosed and claimed herein over the cobalt catalyst is the elimination of undesirable gaseous by-products, including carbon dioxide and methane which are obtained as a result of the water-gas shift reaction catalyzed by cobalt.

Example 1

A batch reactor is charged with the following ingredients: 0.936 gram of a ruthenium compound having the formula $RuCl_3 \cdot 3H_2O$, 51 grams of methyl iodide, 150 grams of benzene as a solvent and 100 grams of phenol as feedstock.

The reactor is pressurized with carbon monoxide to a total pressure of 500 p.s.i.g., corresponding to a carbon monoxide partial pressure of about 425 p.s.i.g., at the reaction temperature of 195° C. The reaction is carried out at a constant pressure to yield a solution containing the following distribution of products:

21.1 wt. percent benzoic acid
78.8 wt. percent (catalyst components, etc.)

No significant amounts of by-products such as aldehydes, ether, higher boiling carboxylic acids or carbon dioxide are formed.

Example 2

A batch reactor is charged with the following ingredients: 0.554 gram of $IrCl_3 \cdot 4H_2O$ with 46 grams of 57% aqueous hydrogen iodide, 200 grams of acetic acid as solvent and 200 grams of benzyl alcohol as feedstock. The reactor is pressurized with carbon monoxide to a total pressure of 1000 p.s.i.g. (partial pressure of carbon monoxide about 800 p.s.i.g.) at the reaction temperature of 175° C. The reaction is carried out at constant pressure. Upon analysis by gas chromatography, it was found that selectivity to the formulation of the desired phenyl acetic acid product is greater than 70 vol. percent. No significant amounts of by-products such as aldehydes, higher boiling carboxylic acids, methane or carbon dioxide are formed.

Example 3

A batch reactor is charged with the following components: 1.396 grams of $OsCl_3$, 92 grams of 57% aqueous hydrogen iodide, 200 grams of acetic acid as solvent and 200 grams of $CH_3C_6H_5CH_2OH$ as feedstock. The reactor is pressurized with carbon monoxide to a total pressure of 1000 p.s.i.g. (750 p.s.i.g. partial pressure of carbon monoxide) at the reaction temperature of 175° C. The reaction is carried out at constant pressure to yield a solution containing 23% $CH_3C_6H_5CH_2COOH$.

Example 4

This example demonstrates that the reaction may be carried out in the presence of a carbon monoxide stream containing significant quantities of hydrogen without the formation of undesirable products such as acetaldehyde, higher alcohols or catalyst decomposition. A batch reactor is charged with 6.4 grams of 5 wt. percent iridium metal on carbon, 28.8 grams of $CH_3I$, 154 grams of benzene as solvent, and 200 grams of benzyl alcohol as feedstock. The reactor is pressurized with a gas mixture of 62 vol. percent carbon monoxide and 38 vol. percent hydrogen at a total pressure of 2,000 p.s.i.g. (1100 p.s.i.g. partial pressure of carbon monoxide). The selectivity to formation of the phenyl acetic acid product is greater than 70% at substantially 80% conversion of benzyl alcohol. No substantial amounts of reduced materials or other by-products such as aldehydes, ethers, higher alcohols or carboxylic acids, methane, carbon dioxide, etc., are detected by gas chromatography, thus distinguishing from cobalt catalysts which yield such by-products as the result of hydrogenation catalyzed by the cobalt.

A similar result is obtained with another synthetic gas mixture, e.g., a 66 vol. percent hydrogen, 33 vol. percent carbon monoxide, such as is obtained from a commercial unit. The various impurities, e.g., nitrogen, hydrogen, carbon dioxide and paraffinic hydrocarbons of 1 to 4 carbon atoms which are present in such feed gas mixtures, do not adversely affect the present reaction.

Example 5

Example 2 is substantially repeated except that the iridium compound is $IrI_3$. A good yield of phenyl acetic acid is obtained.

Example 6

Example 2 is substantially repeated except that hydrogen bromide is substituted for the hydrogen iodide. A good yield of phenyl acetic acid is obtained.

What is claimed is:

1. A process for the carbonylation of a reactant selected from the group consisting of phenol, o-cresol, m-cresol, p-cresol, catechol, resorcinol, quinol, pyrrogallol, phloroglucinol, benzyl iodide, benzyl acetate and hydrocarbon aryl alkyl alcohols wherein the aryl radical is monocyclic with the hydroxy group attached to the alkyl group and the alkyl groups have no more than four carbon atoms, said process comprising contacting
(1) at least one of said reactants,
(2) carbon monoxide, and
(3) a catalyst system consisting essentially of
 (a) an iridium compound, and
 (b) a halogen component wherein during said contacting, said iridium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., and when said reactants consist of compounds selected from the group consisting of benzyl iodide and benzyl acetate, said contacting is also in the presence of water, and said halogen component of (3)(b) is bromine, iodine, a bromide compound or an iodide compound.

2. The process of claim 1 wherein at least a portion of said halogen component of (3)(b) is iodine or an iodide compound.

3. The process of claim 2 wherein said contacting is carried out in the presence of water.

4. The process of claim 2 wherein said halogen component of (3)(b) is present in an amount of above two atoms of halogen per atom of iridium.

5. The process of claim 1 wherein said iridium compound of (3)(b) and said halogen component of (3)(b) are contained in a liquid reaction medium.

6. The process of claim 5 wherein said halogen component of (3)(b) is present in an amount such as to produce a halogen to iridium atomic ratio of above 2:1 to 50,000:1.

7. The process of claim 6 wherein said halogen component is an iodide compound.

8. The process of claim 7 wherein said liquid reaction medium contains water and when said reactant consists of benzyl acetate or benzyl iodide, said water is present during said contacting in a 50 to 300% excess of the amount of water required to be in equimolar relation to said benzyl acetate or benzyl iodide.

9. The process of claim 1 wherein said reactants are selected from the group consisting of benzyl alcohol, benzyl acetate and benzyl iodide.

10. The process of claim 1 wherein said reactant is benzyl alcohol.

11. The process of claim 1 wherein said iridium compound of (3)(a) is dispersed upon an inert support.

12. The process of claim 11 wherein said carbonylation is carried out with said reactants in the vapor phase.

13. A process for the carbonylation of reactants selected from the group consisting of benzyl alcohol, benzyl acetate and benzyl iodide, said process comprising contacting
(1) at least one of said reactants,
(2) carbon monoxide, and
(3) a catalyst system consisting essentially of
 (a) an iridium compound, and
 (b) a halogen component wherein during said contacting, said iridium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., at least a portion of said halogen component being provided by hydrogen iodide, hydrogen bromide, methyl iodide or methyl bromide and said contacting also being carried out in the presence of water.

14. The process of claim 13 wherein said reactant is benzyl alcohol and at least a portion of said halogen component of (3)(b) being provided by hydrogen iodide.

15. A process for the carbonylation of reactants selected from the group consisting of phenol, o-cresol, m-cresol, p-cresol, catechol, resorcinol, quinol, pyrogallol, phloroglucinol, benzyl iodide, benzyl acetate and hydrocarbon aryl alkyl alcohols wherein the aryl radical is monocyclic with the hydroxy group attached to the alkyl group and the alkyl groups have no more than four carbon atoms, said process comprising contacting
(1) at least one of said reactants,
(2) carbon monoxide, and
(3) a catalyst system consisting essentially of
 (a) an iridium compound, and
 (b) a halogen component wherein during said contacting, said iridium compound and said halogen component are present in an amount sufficient to catalyze the carbonylation of said reactants and said halogen component is present in an amount of above two atoms of halogen per atom of iridium, said contacting being carried out at a temperature in the range of 50 to 300° C. and at a carbon monoxide partial pressure in the range of 1 to 15,000 p.s.i.g., and when said reactants consist of benzyl acetate or benzyl iodide, said contacting is also in the presence of water, said iridium compound of (3)(a) is provided by a material selected from the group consisting of iridium salts, iridium oxides and iridium carbonyls consisting only of iridium and carbonyl moeities and said halogen component of (3)(b) is provided by bromine, iodine, a bromide compound or an iodide compound.

16. The process of claim 15 wheerin said reactant is benzyl alcohol, said halogen component of (3)(b) is provided by an iodide compound, said iodide compound being present in an amount such as to produce an iodine to iridium atomic ratio within the range of above 2:1 to 50,000:1, said iridium compound of (3)(b) and said iodide compound being contained in a liquid reaction medium.

17. The process of claim 16 wherein said contacting is carried out in the presence of water.

18. The process of claim 15 wherein said iridium compound of (3a) is dispersed upon an inert solid support.

19. The process of claim 18 wherein said carbonylation is carried out with said reactants in the vapor phase.

References Cited

UNITED STATES PATENTS

| | | | |
|---|---|---|---|
| 2,739,169 | 3/1956 | Hagemeyer, Jr | 260—540 |
| 2,710,878 | 6/1955 | Glasebrook | 260—532 |
| 3,020,314 | 2/1962 | Alderson | 260—533 |
| 3,065,242 | 11/1962 | Alderson et al. | 260—497 |
| 3,168,553 | 2/1965 | Slaugh | 260—497 |
| 3,338,961 | 8/1967 | Clossen et al. | 260—544 |
| 3,367,961 | 2/1968 | Brewbaker | 260—486 |
| 3,700,729 | 10/1972 | Fenton | 260—515 |

VIVIAN GARNER, Primary Examiner

U.S. Cl. X.R.

260—469, 475 PN, 515 P, 515 R, 532